United States Patent
Hotto

(10) Patent No.: US 9,059,440 B2
(45) Date of Patent: *Jun. 16, 2015

(54) ENHANCED EFFICIENCY TURBINE

(75) Inventor: Robert Hotto, Carlsbad, CA (US)

(73) Assignees: ENERGYIELD LLC, Carlsbad, CA (US); John L. Rogitz, San Diego, CA (US)

( * ) Notice: Subject to any disclaimer, the term of this patent is extended or adjusted under 35 U.S.C. 154(b) by 785 days.

This patent is subject to a terminal disclaimer.

(21) Appl. No.: 13/240,333

(22) Filed: Sep. 22, 2011

(65) Prior Publication Data

US 2012/0006036 A1    Jan. 12, 2012

Related U.S. Application Data

(63) Continuation of application No. 12/890,330, filed on Sep. 24, 2010, now Pat. No. 8,047,006, which is a continuation of application No. 12/641,626, filed on Dec. 18, 2009, now Pat. No. 7,818,969.

(51) Int. Cl.
| | |
|---|---|
| F02B 43/00 | (2006.01) |
| H01M 8/06 | (2006.01) |
| H01M 8/08 | (2006.01) |
| H01M 8/10 | (2006.01) |
| H01M 8/12 | (2006.01) |
| H01M 8/14 | (2006.01) |

(52) U.S. Cl.
CPC .............. *H01M 8/0618* (2013.01); *H01M 8/08* (2013.01); *H01M 2008/1095* (2013.01); *H01M 2008/1293* (2013.01); *H01M 2008/147* (2013.01); *H01M 2250/20* (2013.01); *Y02E 60/50* (2013.01); *Y02E 60/525* (2013.01); *Y02E 60/526* (2013.01); *Y02T 90/32* (2013.01)

(58) Field of Classification Search
USPC .................. 60/780, 801, 698, 716, 39.12
See application file for complete search history.

(56) References Cited

U.S. PATENT DOCUMENTS 1,611,429 A    12/1926    Fish
1,614,560 A    1/1927    Kirschbraun
(Continued)

FOREIGN PATENT DOCUMENTS

JP    06-223851    8/1994
JP    2002-213304    7/2002
(Continued)

OTHER PUBLICATIONS

Daniel R. Cohn, Lesile Bromberg, Sid Diamond, James Eberhardt, Arron Yocum, "IV.B Onboard Plasmatron Hydrogen Production for Improved Vehicles" Heavy Vehicle System Optimization Program FY 2005 Annual Report, pp. 133-137.

(Continued)

*Primary Examiner* — Gerald L Sung
(74) *Attorney, Agent, or Firm* — John L. Rogitz

(57) ABSTRACT

Hydrocarbon fuel is sent to a reformer, which produces carbon and hydrogen. The hydrogen is sent to a fuel cell which uses it to generate electricity, and the electricity is used to actuate an electric motor that is coupled to an output shaft of a turbine to impart torque to the shaft. Additionally, hydrocarbon fuel can be provided to the turbine intake directly and/or carbon from the reformer can be mixed with steam from the fuel cell and sent to the turbine intake, in either case to impinge on the turbine blades and impart further torque to the output shaft.

41 Claims, 2 Drawing Sheets

(56) References Cited

U.S. PATENT DOCUMENTS

| | | |
|---|---|---|
| 1,701,621 A | 2/1929 | Kirschbraun |
| 1,975,631 A | 10/1934 | Bonfield |
| 2,461,580 A | 2/1949 | Kokatnu et al. |
| 3,527,581 A | 9/1970 | Brownawell et al. |
| 3,565,817 A | 2/1971 | Lissant |
| 3,658,302 A | 4/1972 | Duthion et al. |
| 3,766,942 A | 10/1973 | Delatronchette et al. |
| 3,769,963 A | 11/1973 | Goldman et al. |
| 3,862,819 A | 1/1975 | Wentworth, Jr. |
| 4,009,984 A | 3/1977 | Morrison |
| 4,014,637 A | 3/1977 | Schena |
| 4,116,610 A | 9/1978 | Berthiaume |
| 4,119,862 A | 10/1978 | Gocho |
| 4,172,814 A | 10/1979 | Moll et al. |
| 4,173,449 A | 11/1979 | Israel |
| 4,218,221 A | 8/1980 | Cottell |
| 4,309,998 A | 1/1982 | Aron et al. |
| 4,376,037 A | 3/1983 | Dahlberg et al. |
| 4,391,275 A | 7/1983 | Fankhauser et al. |
| 4,431,520 A | 2/1984 | Giuliani et al. |
| 4,563,982 A | 1/1986 | Pischinger et al. |
| 4,579,430 A | 4/1986 | Bille |
| 4,618,348 A | 10/1986 | Hayes et al. |
| 4,637,870 A | 1/1987 | Bearden, Jr. et al. |
| 4,659,454 A | 4/1987 | Varghese et al. |
| 4,665,913 A | 5/1987 | L'Esperance, Jr. |
| 4,669,466 A | 6/1987 | L'Esperance |
| 4,687,491 A | 8/1987 | Latty |
| 4,696,638 A | 9/1987 | DenHerder |
| 4,708,753 A | 11/1987 | Forsberg |
| 4,722,303 A | 2/1988 | Leonhard |
| 4,761,071 A | 8/1988 | Baron |
| 4,784,135 A | 11/1988 | Blum et al. |
| 4,832,701 A | 5/1989 | Polanco et al. |
| 4,848,340 A | 7/1989 | Bille et al. |
| 4,881,808 A | 11/1989 | Bille et al. |
| 4,901,718 A | 2/1990 | Bille et al. |
| 4,907,586 A | 3/1990 | Bille et al. |
| 4,911,711 A | 3/1990 | Telfair et al. |
| 4,923,768 A | 5/1990 | Kaneko et al. |
| 4,981,883 A | 1/1991 | Kunz et al. |
| 5,000,757 A | 3/1991 | Puttock et al. |
| 5,002,020 A | 3/1991 | Kos |
| 5,039,392 A | 8/1991 | Bearden, Jr. et al. |
| 5,049,147 A | 9/1991 | Danon |
| 5,054,907 A | 10/1991 | Sklar et al. |
| 5,062,702 A | 11/1991 | Bille |
| 5,098,426 A | 3/1992 | Sklar et al. |
| 5,147,352 A | 9/1992 | Azema et al. |
| 5,162,641 A | 11/1992 | Fountain |
| 5,170,193 A | 12/1992 | McMillan et al. |
| 5,283,598 A | 2/1994 | McMillan et al. |
| 5,284,477 A | 2/1994 | Hanna et al. |
| 5,298,230 A | 3/1994 | Argabright et al. |
| 5,319,925 A | 6/1994 | Hendriks et al. |
| 5,344,306 A | 9/1994 | Brown et al. |
| 5,391,165 A | 2/1995 | Fountain et al. |
| 5,413,879 A | 5/1995 | Domeracki et al. |
| 5,417,051 A | 5/1995 | Ankersmit et al. |
| 5,419,852 A | 5/1995 | Rivas et al. |
| 5,469,830 A | 11/1995 | Gonzalez |
| 5,482,791 A | 1/1996 | Shingai et al. |
| 5,503,772 A | 4/1996 | Rivas et al. |
| 5,535,708 A | 7/1996 | Valentine |
| 5,584,894 A | 12/1996 | Peter-Hoblyn et al. |
| 5,603,864 A | 2/1997 | Silva et al. |
| 5,678,647 A | 10/1997 | Wolfe et al. |
| 5,741,245 A | 4/1998 | Cozean et al. |
| 5,785,136 A | 7/1998 | Falkenmayer et al. |
| 5,873,916 A | 2/1999 | Cemenska et al. |
| 5,948,721 A | 9/1999 | Yuansheng et al. |
| 5,995,039 A * | 11/1999 | Jensen et al. .................. 342/104 |
| 6,004,454 A | 12/1999 | Yuansheng et al. |
| 6,098,733 A | 8/2000 | Ibaraki et al. |
| 6,105,697 A | 8/2000 | Weaver |
| 6,209,672 B1 | 4/2001 | Severinsky |
| 6,213,234 B1 | 4/2001 | Rosen et al. |
| 6,230,494 B1 | 5/2001 | Botti et al. |
| 6,325,792 B1 | 12/2001 | Swinger et al. |
| 6,338,391 B1 | 1/2002 | Severinsky et al. |
| 6,367,570 B1 | 4/2002 | Long, III et al. |
| 6,392,313 B1 | 5/2002 | Epstein et al. |
| 6,458,478 B1 | 10/2002 | Wang et al. |
| 6,536,547 B1 | 3/2003 | Meaney, Jr. |
| 6,541,876 B2 | 4/2003 | Shimizu et al. |
| 6,554,088 B2 | 4/2003 | Severinsky et al. |
| 6,581,705 B2 | 6/2003 | Phillips et al. |
| 6,605,376 B2 | 8/2003 | Verykios |
| 6,609,582 B1 | 8/2003 | Botti et al. |
| 6,612,269 B2 | 9/2003 | Heffel et al. |
| 6,621,175 B1 | 9/2003 | Kuroda et al. |
| 6,641,625 B1 | 11/2003 | Clawson et al. |
| 6,655,325 B1 | 12/2003 | Botti et al. |
| 6,659,213 B2 | 12/2003 | Kubo et al. |
| 6,664,651 B1 | 12/2003 | Kotre et al. |
| 6,672,415 B1 | 1/2004 | Tabata |
| 6,701,229 B2 | 3/2004 | Iwasaki |
| 6,715,452 B1 | 4/2004 | Taylor, III et al. |
| 6,736,229 B1 | 5/2004 | Amori et al. |
| 6,808,145 B2 | 10/2004 | Burton |
| 6,815,102 B2 | 11/2004 | Bowman et al. |
| 6,817,182 B2 | 11/2004 | Clawson |
| 6,819,985 B2 | 11/2004 | Minagawa et al. |
| 6,827,047 B2 | 12/2004 | Qian et al. |
| 6,837,702 B1 | 1/2005 | Shelor et al. |
| 6,868,677 B2 | 3/2005 | Viteri et al. |
| 6,896,988 B2 | 5/2005 | Wang et al. |
| 6,908,700 B2 | 6/2005 | Lio |
| 6,913,603 B2 | 7/2005 | Knopp et al. |
| 6,978,621 B2 | 12/2005 | Bunker et al. |
| 6,981,472 B2 | 1/2006 | Bromberg et al. |
| 6,989,209 B2 | 1/2006 | Sanderson |
| 6,994,930 B1 | 2/2006 | Geisbretch et al. |
| 7,147,072 B2 | 12/2006 | Botti |
| 7,150,143 B2 * | 12/2006 | Schick et al. ................. 60/39.38 |
| 7,153,599 B2 | 12/2006 | Bunker et al. |
| 7,184,875 B2 | 2/2007 | Ferrall et al. |
| 7,380,749 B2 | 6/2008 | Fucke et al. |
| 7,410,713 B2 | 8/2008 | Balan et al. |
| 7,456,517 B2 | 11/2008 | Campbell et al. |
| 7,520,350 B2 | 4/2009 | Hotto |
| 7,536,981 B2 | 5/2009 | Sadikay |
| 7,563,527 B2 | 7/2009 | Tanaka et al. |
| 7,585,406 B2 | 9/2009 | Khadzhiev et al. |
| 7,595,124 B2 | 9/2009 | Varatharajan et al. |
| 7,615,304 B2 | 11/2009 | Ferrall et al. |
| 7,752,848 B2 | 7/2010 | Balan et al. |
| 7,803,473 B2 | 9/2010 | Balan et al. |
| 8,016,228 B2 | 9/2011 | Fucke et al. |
| 8,096,109 B2 | 1/2012 | Schlerf et al. |
| 8,841,041 B2 | 9/2014 | Biederman et al. |
| 8,910,484 B2 | 12/2014 | Hoffjann et al. |
| 2001/0023034 A1 | 9/2001 | Verykios |
| 2002/0172845 A1 * | 11/2002 | Shimada et al. ................. 429/19 |
| 2002/0174659 A1 | 11/2002 | Viteri et al. |
| 2003/0054214 A1 | 3/2003 | Noelscher |
| 2004/0038097 A1 | 2/2004 | Bunker |
| 2004/0053087 A1 | 3/2004 | Akikusa et al. |
| 2004/0197612 A1 | 10/2004 | Keefer et al. |
| 2004/0237406 A1 | 12/2004 | Fuder |
| 2005/0019620 A1 * | 1/2005 | Schick et al. ................... 429/12 |
| 2005/0144961 A1 | 7/2005 | Colibaba-evulet et al. |
| 2005/0196659 A1 | 9/2005 | Grieve et al. |
| 2006/0010866 A1 | 1/2006 | Rehg et al. |
| 2006/0063046 A1 | 3/2006 | Hu et al. |
| 2006/0180362 A1 | 8/2006 | Yamaguchi et al. |
| 2007/0077459 A1 * | 4/2007 | Walton et al. ................... 429/12 |
| 2007/0266695 A1 | 11/2007 | Lui et al. |
| 2008/0003466 A1 * | 1/2008 | Stevens et al. ................. 429/13 |
| 2008/0118800 A1 | 5/2008 | Devrient et al. |
| 2008/0187789 A1 | 8/2008 | Ghezel-Ayagh |
| 2009/0001727 A1 | 1/2009 | De Koeijer et al. |
| 2009/0107149 A1 * | 4/2009 | Galey et al. ..................... 60/772 |
| 2011/0159386 A1 | 6/2011 | Kaupert et al. |

(56) References Cited

U.S. PATENT DOCUMENTS

| | | | |
|---|---|---|---|
| 2011/0207003 A1 | 8/2011 | Anfang et al. |
| 2012/0088167 A1 | 4/2012 | Reiners et al. |
| 2012/0251899 A1 | 10/2012 | Lehar et al. |
| 2012/0285162 A1 | 11/2012 | Ahn et al. |
| 2014/0060461 A1 | 3/2014 | Shapiro et al. |

FOREIGN PATENT DOCUMENTS

| | | |
|---|---|---|
| JP | 2006515912 | 6/2006 |
| JP | 2007-287579 | 1/2007 |
| JP | 2009-211836 | 9/2009 |
| JP | 2009205932 | 9/2009 |
| JP | 4450623 | 4/2010 |
| WO | 2007113507 | 10/2007 |

OTHER PUBLICATIONS

Green Car Congress, "Researches Exploring on-Board Exhaust Gas Reforming to Improve Combustion and Recover Waste Heat", http://www.greencarcongress.com/2010/golunski-20101015 . . . Nov. 25, 2012.

Rong-Fang Horng, Ming-Pin Lai,"Waste Heat recycling for Fuel Reforming, Chapter 16", www.intechopen.com pp. 355-381, book published Apr. 2012.

Martin Richard Jones, "Feasibility Studies of the Exhaust-Gas Reforming of Hydrocarbon and Alcohol Fuels" Thesis submitted to the University of Birmingham, Apr. 1992 (300 pages).

Jack Brouwer, Ph.D, "The Gas Turbine Handbook, Chapter 1.4 Hybrid Gas Turbine Fuel Cell Systems" pp. 127-163, published by U.S. Department of Energy NETL 2006.

Wolfgang Winkler, Hagen Lorenz, "Layout of SOFC-GT Cycles with Electric Efficiencies Over 80%", http://www.mp.haw-hamburg.de/pers/Winkler/4EUSOFCF.pdf, Published Sep. 27, 2013.

Scott Samuelsen, "Fuel Cell/Gas Turbine Hybrid Systems" 2004 ASME International Gas Turbine Institute, pp. 1-10.

Joshua E. Freeh, Joseph W. Pratt, Jacob Brouwer, "NASA Development of a Solid-Oxide Fuel Cell/ Gas Turbine Hybrid System Model for Aerospace Applications" NASA/TM-2004-213054 GT23004-53616, May 2004.

K. Duraiswamy, Anand Chellappa, Gregory Smith, Yi Liu, Mingheng Li; "Development of high-efficiency hydrogen generator for fuel cells for distributed power generation", International Journal of Hydrogen Energy, vol. 35, Issue 17, pp. 8962-8969, Sep. 2010.

* cited by examiner

ENHANCED EFFICIENCY TURBINE

This is a continuation application of and claims priority to U.S. patent application Ser. No. 12/890,330 filed Sep. 24, 2010 which is a continuation of U.S. patent application Ser. No. 12/641,626, filed Dec. 18, 2009, now U.S. Pat. No. 7,818,969.

FIELD OF THE INVENTION

The present invention relates generally to using fuel cells to actuate turbines.

BACKGROUND OF THE INVENTION

The importance of energy conservation goes without saying. Not only must fossil fuels be conserved for future use, but limiting the amount of fossil fuels that must be burned appears to be highly beneficial for the environment. Hence, the present invention.

SUMMARY OF THE INVENTION

Accordingly, a system includes a reformer receiving hydrocarbon fuel and outputting a stream of hydrogen and a stream of carbon separate from the stream of hydrogen. A fuel cell receives hydrogen output by the reformer but the fuel cell does not receive the stream of carbon. The fuel cell provides a first energy output and an output of water vapor which is mixed with carbon output by the reformer to provide a mixture. The mixture is directed against blades of a turbine to impart torque to an output shaft of the turbine while the first energy output of the fuel cell is also used to impart torque to the output shaft of the turbine.

In example embodiments the mixture further includes a surfactant. If desired, the output shaft of the turbine can be coupled to a generator to cause the generator to output electricity when the output shaft is rotated, or the turbine can be used to propel a vehicle to move.

The first energy output of the fuel cell may be connected to an electric motor and the electric motor coupled to a rotor coupling in the turbine, with the first energy output actuating the electric motor. In some embodiments the hydrocarbon fuel is provided to an intake of the turbine in addition to being provided to the reformer. Also, if desired the fuel cell can be electrically connected to a turbine ignition component to provide ignition energy thereto.

In another aspect, a system includes a turbine including an output shaft and a fuel cell providing output that is coupled to the turbine so as to impart torque to the output shaft.

In another aspect, a method includes reforming hydrocarbon fuel into hydrogen and carbon, using the hydrogen to produce electricity, and using the electricity to impart torque to an output shaft of a turbine.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
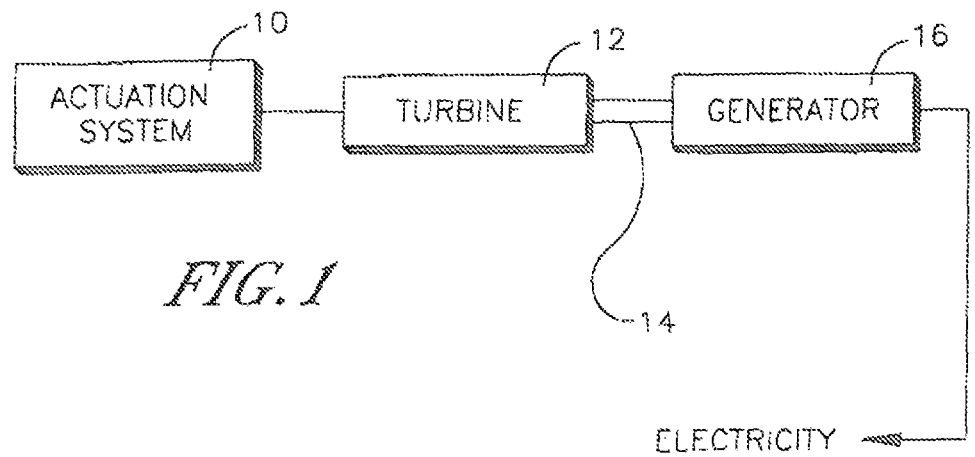
FIG. 1 is a schematic representation of a turbine-powered generator in accordance with present principles.
Figure 2:
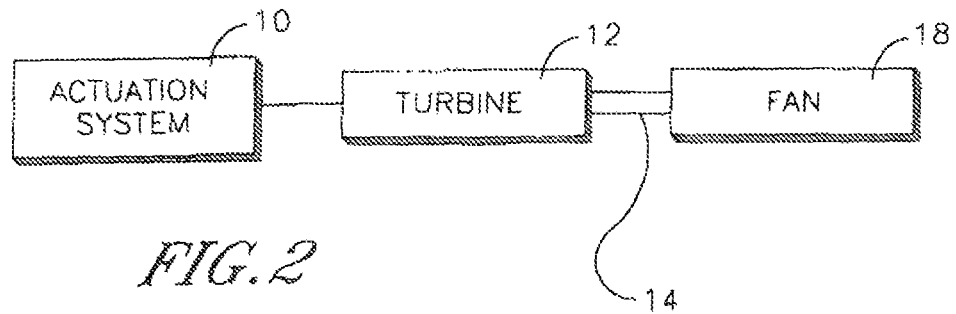
FIG. 2 is a schematic representation of a turbine-powered aircraft propulsion system in accordance with present principles.
Figure 3:
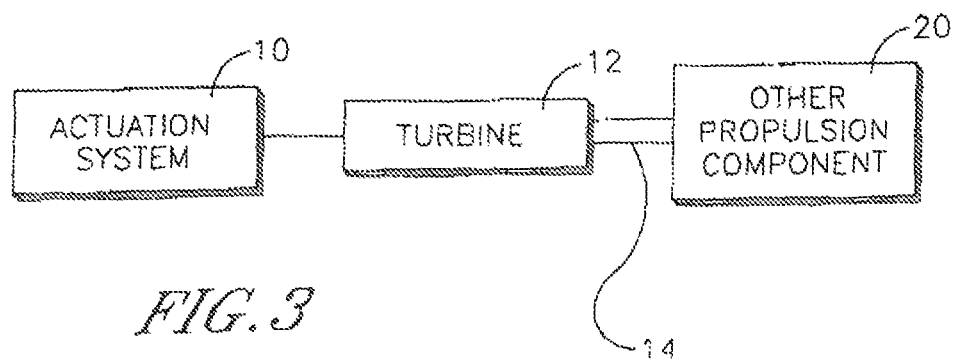
FIG. 3 is a schematic representation of a turbine-powered propulsion system for, e.g., land vehicles, helicopters, and watercraft in accordance with present principles.

FIGS. 1-3 show various illustrative non-limiting applications of present principles. An actuation system 10, described further below, imparts torque to a rotor of a turbine 12 to rotate an output shaft 14 of the turbine. The turbine 12 may include a compressor section and a turbine section in accordance with turbine principles and may also have one or more rotors or shafts which typically are coupled to each other and which may be concentric to each other.

In FIG. 1, an output shaft 14 of the turbine is coupled to the rotor of an electrical generator 16 to rotate the generator rotor within an electric field and thus cause the generator 16 to output electricity. In FIG. 2, the output shaft 14 is coupled to the rotor of an aircraft fan 18, to rotate the fan and thus cause it to generate thrust for propelling a turbofan jet plane. In FIG. 3, the output shaft 14 is coupled to the rotor of a propulsion component 20 such as the rotor of a helicopter, the shaft of a watercraft on which a propeller is mounted, or a drive shaft of a land vehicle such as a military tank to rotate the rotor/shaft/drive shaft as the case may be to propel the platform through the air or water or over land, depending on the nature of the conveyance. The propulsion component 20 may include a drive train that can include a combination of components known in the art, e.g., crankshafts, transmissions, axles, and so on.

Figure 4:
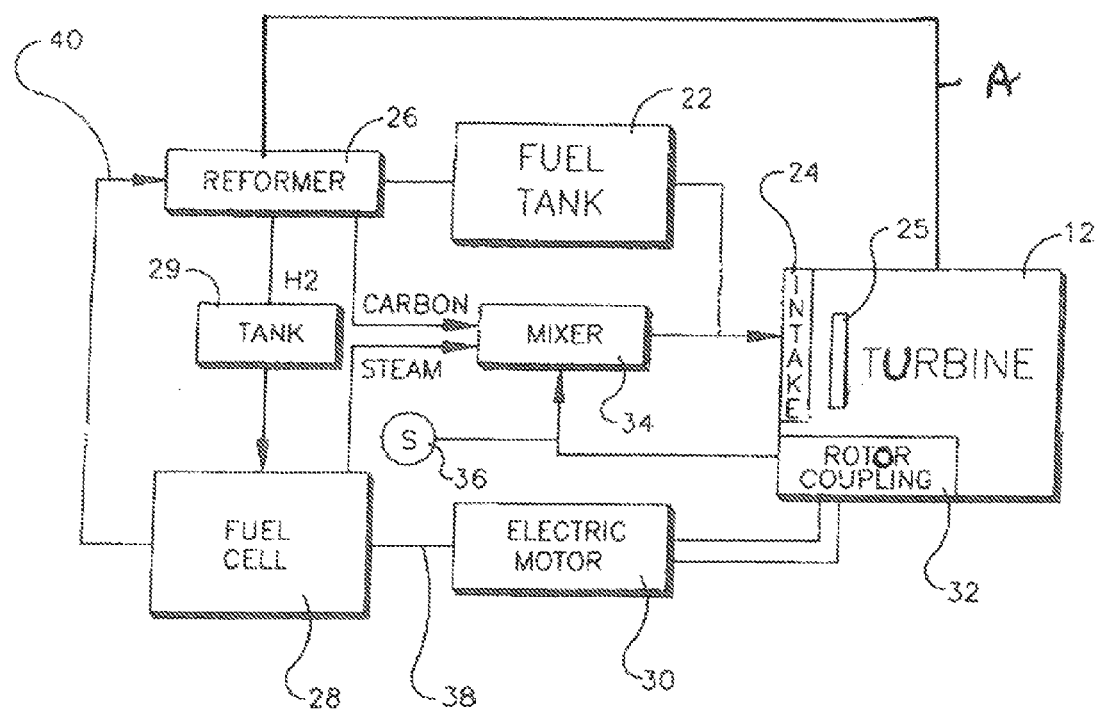
FIG. 4 is a block diagram of an example of the present actuation system.

FIG. 4 shows the details of an example embodiment of the actuation system 10. A fuel tank 22 which contains hydrocarbon-based fuel such as but not limited to jet fuel can provide fuel to the intake 24 of the turbine 12. The fuel typically is injected through injectors in the turbine, where it mixes with air compressed by the compressor section of the turbine and ignited in a so-called "flame holder" or "can". "Intake" refers generally to these portions of the turbine that are preliminary to the turbine blades. The high pressure mixture is then directed to impinge on turbine blades 25 which are coupled to the output shaft 14. In this way torque is imparted to the output shaft 14 to cause it to rotate about its axis.

In addition to or in lieu of actuating the turbine 12 with fuel directly from the fuel tank 22, the actuation system 10 may include a reformer 26 which receives fuel from the fuel tank 22. The reformer 26 produces hydrogen from the fuel, and the hydrogen is sent to a fuel cell 28, in some cases through a hydrogen tank 29 first as shown. If desired, multiple reformers and/or fuel cells may be used in parallel with each other.

The fuel cell 28 uses the hydrogen to generate electricity, typically with a relatively high efficiency, by mixing the hydrogen with oxygen from, e.g., the ambient atmosphere. Without limitation, the fuel cell 28 may be a polymer exchange membrane fuel cell (PEMFC), a solid oxide fuel cell (SOFC), an alkaline fuel cell (AFC), a molten-carbonate fuel cell (MCFC), a phosphoric-acid fuel cell (PAFC), or a direct-methanol fuel cell (DMFC).

In turn, electricity from the fuel cell 28 is sent to an electric motor 30 to cause an output shaft of the motor 30 to turn. The motor shaft is mechanically coupled through a rotor coupling 32 to a rotor of the turbine 12. Typically, the turbine rotor to which the motor 30 is coupled is not the same segment of rotor bearing the blades 25, although in some implementations this can be the case. Instead, the turbine rotor to which the motor 30 may be coupled may be a segment of the blade rotor that does not bear blades or a rotor separate from the blade rotor and concentric therewith or otherwise coupled thereto. In any case, the motor 30, when energized by the fuel cell 28, imparts torque (through appropriate couplings if desired) through a turbine rotor to the output shaft 14 of the turbine 12, which in some cases may be the same shaft as that establishing the turbine rotor.

In addition, to realize further efficiencies, water in the form of steam produced by the fuel cell 28 may be mixed with carbon from the reformer 26 in a mixer 34, which may be a tank or simple pipe or other void in which the water and carbon can mix, with the mixture then being directed (through, e.g., appropriate piping or ducting) to the turbine intake 24. If desired, surfactant from a surfactant tank 36 may also be added to the steam/carbon mixture. In any case, it may now be appreciated that the steam/carbon mixture may supplement fuel injection directly from the fuel tank 22 to the turbine intake 24, or replace altogether fuel injection directly from the fuel tank 22 to the turbine intake 24.

Still further, as indicated by the electrical line 38 in FIG. 4, electricity produced by the fuel cell 28 may be used not only to actuate the electric motor 30 but also to provide ignition current for the appropriate components in the turbine intake 24. In cases where the reformer 26 generates carbon dioxide and steam, these fluids may also be directed to the intake 24 directly from the reformer 26 or through the mixer 34.

In some embodiments, water can be returned from the fuel cell 28 if desired to the reformer 26 through a water line 40. Also if desired, heat from the turbine 12 may be collected and routed back to the reformer 26 through ducting/piping "A" to heat the reformer.

While the particular ENHANCED EFFICIENCY TURBINE is herein shown and described in detail, the scope of the present application is limited only by the appended claims.

What is claimed is:

1. A system comprising:
   at least one reformer assembly receiving hydrocarbon fuel and outputting hydrogen from as first output and product depleted of hydrogen from a second output separate from the first output outputting hydrogen;
   at least one fuel cell receiving hydrogen from the first output of the reformer but not being connected to the second output of the reformer, the fuel cell providing a first energy output and an output of exhaust;
   product from the second output of the reformer being directed into a receiver such that the receiver receives both the exhaust from the fuel cell and the product from the second output of the reformer.

2. The system of claim 1, wherein the exhaust from the fuel cell and the product from the second output of the reformer are mixed to establish a mixture, and the mixture further includes a surfactant.

3. The system claim 1, wherein the receiver is a turbine and an output shaft of the turbine is coupled to a generator to cause the generator to output electricity the output shaft is rotated.

4. The system of claim 1, wherein the receive an engine that propels a vehicle to move.

5. The system of claim 1, wherein the first energy output of the fuel cell is connected to an electric motor and the electric motor is coupled to a rotor coupling of the receiver, the first energy output actuating the electric motor.

6. The system of claim of claim 1, wherein the hydrocarbon fuel is provided to an intake of the receiver in addition to being provided to the reformer.

7. The system of claim 1, wherein the fuel cell is electrically connected to a turbine ignition component to provide ignition energy thereto.

8. The system of claim 1, wherein the fuel cell is a polymer exchange membrane (PEM) fuel cell.

9. The system of claim 1, wherein the system is configured such that $H_2O$ from the fuel cell is sent to the reformer.

10. The system of claim 1, wherein the system is configured such that heat from the turbine is provided to the reformer.

11. The system of claim 1, wherein the fuel cell is a solid oxide fuel cell.

12. The system of claim 1, wherein the fuel cell is an alkaline fuel cell.

13. The system of claim 1, wherein the fuel cell is a molten carbonate fuel cell.

14. The system of claim 1, wherein the fuel cell is a phosphoric acid fuel cell.

15. The system of claim 1, wherein the fuel cell is a direct methanol fuel cell.

16. A system comprising:
   at least one fuel cell providing output;
   at least one reformer assembly receiving hydrocarbon fuel and reforming the hydrocarbon fuel into hydrogen and carbon outputs;
   the fuel cell receiving the hydrogen output from the reformer assembly, wherein the fuel cell produces exhaust, at least the exhaust of the fuel cell resulting from the fuel cell processing the hydrogen output from the reformer assembly being directed to a turbine to impart torque to the turbine, the turbine including injectors configured for receiving the exhaust of the fuel cell resulting from the fuel cell processing the hydrogen output from the reformer assembly and for injecting the exhaust of the fuel cell resulting from fuel cell processing the hydrogen output from the reformer assembly into the turbine, the turbine further comprising a compressor section of the turbine, and a combustor section for igniting the exhaust of the fuel cell resulting from the fuel cell processing the hydrogen output from the former assembly received from the injectors.

17. The system of claim 16, wherein the fuel cell is electrically connected to an electric motor to actuate the electric motor.

18. The system of claim 16, wherein fluid or steam produced by the fuel cell is directed to an intake of the turbine.

19. The system of claim 16, wherein the system provides hydrocarbon fuel that does not pass through the reformer to an intake of the turbine.

20. The system of claim 16, wherein the fuel cell is electrically connected to a turbine ignition component to provide ignition energy thereto.

21. The system of claim 16, wherein the fuel cell is a polymer exchange membrane (PEM) fuel cell.

22. The system of claim 16, wherein the system is configured such that $H_2O$ from the fuel cell is sent to the reformer.

23. The system of claim 16, wherein the system is configured such that heat from the turbine is provided to the reformer.

24. The system of claim 16, wherein the fuel cell is a solid oxide fuel cell.

25. The system of claim 16, wherein the fuel cell is an alkaline fuel cell.

26. The system of claim 16, wherein the fuel cell is a molten carbonate fuel cell.

27. The system of claim 16, wherein the fuel cell is a phosphoric acid fuel cell.

28. The system of claim 16, wherein the fuel cell is a direct methanol fuel cell.

29. A system comprising:
   at least one fuel cell providing output;
   at least one turbine providing output;
   at least one reformer assembly receiving hydrocarbon fuel and outputting separated streams of hydrogen fuel and carbon reformate fuel;
   wherein the hydrogen fuel is directed to the fuel cell and the carbon reformate fuel is directed to the turbine, bypassing the fuel cell.

30. The system of claim 29, wherein the fuel cell is electrically connected to an electric motor to actuate the electric motor.

31. The system of claim 29, wherein fluid or steam produced by the fuel cell is directed to an intake of the turbine.

32. The system of claim 29, wherein the system provides turbine hydrocarbon fuel to an intake of the turbine, the turbine hydrocarbon fuel not passing through the reformer.

33. The system of claim 29, wherein the fuel cell is electrically connected to a turbine ignition component to provide ignition energy thereto.

34. The system of claim 29, wherein the fuel cell is a polymer exchange membrane (PEM) fuel cell.

35. The system of claim 29, wherein the system is configured such that $H_2O$ from the fuel cell is sent to the reformer.

36. The system of claim 29, wherein the system is configured such that heat from the turbine is provided to the reformer.

37. The system of claim 29, wherein the fuel cell is a solid oxide fuel cell.

38. The system of claim 29, wherein the fuel cell is an alkaline fuel cell.

39. The system of claim 29, wherein the fuel cell is a molten carbonate fuel cell.

40. The system of claim 29, wherein the fuel cell is a phosphoric acid fuel cell.

41. The system of claim 29, wherein the fuel cell is a direct methanol fuel cell.

* * * * *